United States Patent
Montie

(10) Patent No.: US 7,879,155 B1
(45) Date of Patent: *Feb. 1, 2011

(54) PROCESS FOR REMOVAL OF PAINT FROM PLASTIC SUBSTRATES

(75) Inventor: Paul Montie, White Cloud, MI (US)

(73) Assignee: Montie-Targosz Enterprises, LLC, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/826,269

(22) Filed: Jun. 29, 2010

Related U.S. Application Data

(63) Continuation of application No. 12/693,230, filed on Jan. 25, 2010, now Pat. No. 7,744,701, which is a continuation of application No. 12/197,911, filed on Aug. 25, 2008, now abandoned, which is a continuation of application No. 11/894,152, filed on Aug. 20, 2007, now Pat. No. 7,416,612, which is a continuation of application No. 11/436,304, filed on May 18, 2006, now Pat. No. 7,258,750, which is a continuation of application No. 11/135,128, filed on May 23, 2005, now Pat. No. 7,052,556, which is a continuation of application No. 10/797,293, filed on Mar. 10, 2004, now abandoned.

(60) Provisional application No. 60/453,375, filed on Mar. 10, 2003.

(51) Int. Cl.
*B08B 7/00* (2006.01)

(52) U.S. Cl. .............................. 134/38; 134/26; 134/27; 134/28; 134/30; 134/34; 134/35; 134/36; 134/42; 510/201; 510/203; 510/206; 510/243

(58) Field of Classification Search .................. 134/26, 134/27, 28, 30, 34, 35, 36, 38, 42; 510/201, 510/203, 206, 243
See application file for complete search history.

(56) References Cited

U.S. PATENT DOCUMENTS 1,185,641 A 6/1916 Ellis (Continued)

OTHER PUBLICATIONS

STN Registry File CA Index for DBE-4, DBE-5, DBE-6 dibasic esters, Feb. 16, 2005.

(Continued)

*Primary Examiner*—Sharidan Carrillo
(74) *Attorney, Agent, or Firm*—Price, Heneveld, Cooper, DeWitt & Litton LLP

(57) ABSTRACT

A method of removing paint from a plastic substrate at least partially coated with a paint coating by: providing at least one plastic substrate at least partially coated with a paint coating; providing a kit for a user to utilize to remove paint from the plastic substrate, which is at least partially coated with a paint coating; immersing the at least partially coated plastic substrate into first mix of components by the end user wherein the first mix of components further comprises water when the at least partially coated plastic substrates are immersed into the first mix of components; and rinsing the plastic substrate with water. The immersing and rinsing steps remove the paint coating from the plastic substrate. The kit includes: a first mix of components that includes: at least one aromatic alcohol; an alpha-hydroxy acid; an anionic surfactant; 2-mercaptobenzothiazole or salts thereof; and an arene; and instructions instructing an end user to remove paint from the plastic substrate using the first mix of components.

20 Claims, 1 Drawing Sheet

U.S. PATENT DOCUMENTS

| | | | |
|---|---|---|---|
| 2,705,207 | A | 3/1955 | Stevens |
| 3,574,123 | A * | 4/1971 | Laugle et al. ............... 510/205 |
| 3,784,477 | A | 1/1974 | Esposito |
| 3,957,531 | A | 5/1976 | Tipping et al. |
| 4,673,524 | A | 6/1987 | Dean |
| 4,927,556 | A | 5/1990 | Pokorny |
| 4,944,892 | A | 7/1990 | Leathers et al. |
| 5,397,397 | A | 3/1995 | Awad |
| 5,397,496 | A | 3/1995 | Zuerner et al. |
| 5,424,013 | A | 6/1995 | Lieberman |
| 5,443,748 | A | 8/1995 | Bergishagen et al. |
| 5,454,985 | A | 10/1995 | Harbin |
| 5,464,556 | A | 11/1995 | Zuerner et al. |
| 5,569,713 | A | 10/1996 | Lieberman |
| 5,578,135 | A | 11/1996 | Lohr et al. |
| 5,613,984 | A | 3/1997 | Nightingale et al. |
| 5,928,435 | A | 7/1999 | Berger |
| 5,993,561 | A | 11/1999 | Jarema |
| 6,130,192 | A | 10/2000 | Vitomir |
| 6,217,084 | B1 | 4/2001 | Larsson et al. |
| 6,262,133 | B1 | 7/2001 | Wisner |
| 6,303,552 | B1 | 10/2001 | Vitomir |
| 6,348,107 | B1 | 2/2002 | Whitton et al. |
| 6,395,103 | B1 | 5/2002 | Machac, Jr. et al. |
| 6,423,150 | B1 | 7/2002 | Nakayama |
| RE37,849 | E | 9/2002 | Pokorny |
| 6,660,100 | B2 * | 12/2003 | Wiedemann ................... 134/6 |
| 7,052,556 | B1 | 5/2006 | Montie |
| 7,091,163 | B2 | 8/2006 | Wilson |
| 7,179,774 | B2 | 2/2007 | McKay et al. |
| 7,258,750 | B1 | 8/2007 | Montie |
| 7,416,612 | B1 | 8/2008 | Montie |
| 7,482,316 | B2 | 1/2009 | Wilson et al. |
| 7,744,701 | B1 | 6/2010 | Montie |
| 2003/0119686 | A1 * | 6/2003 | Machac et al. ............. 510/201 |
| 2003/0134764 | A1 * | 7/2003 | Hensley ..................... 510/201 |
| 2004/0002437 | A1 | 1/2004 | Wilson |
| 2004/0009884 | A1 | 1/2004 | McKay et al. |
| 2004/0259753 | A1 | 12/2004 | Wilson et al. |
| 2006/0276339 | A1 | 12/2006 | Windsor et al. |

OTHER PUBLICATIONS

Safety (MSDS) data for DBE-6 dibasic ester, Feb. 16, 2005.
Safety (MSDS) data for DBE-5 dibasic ester, Feb. 16, 2005..

* cited by examiner

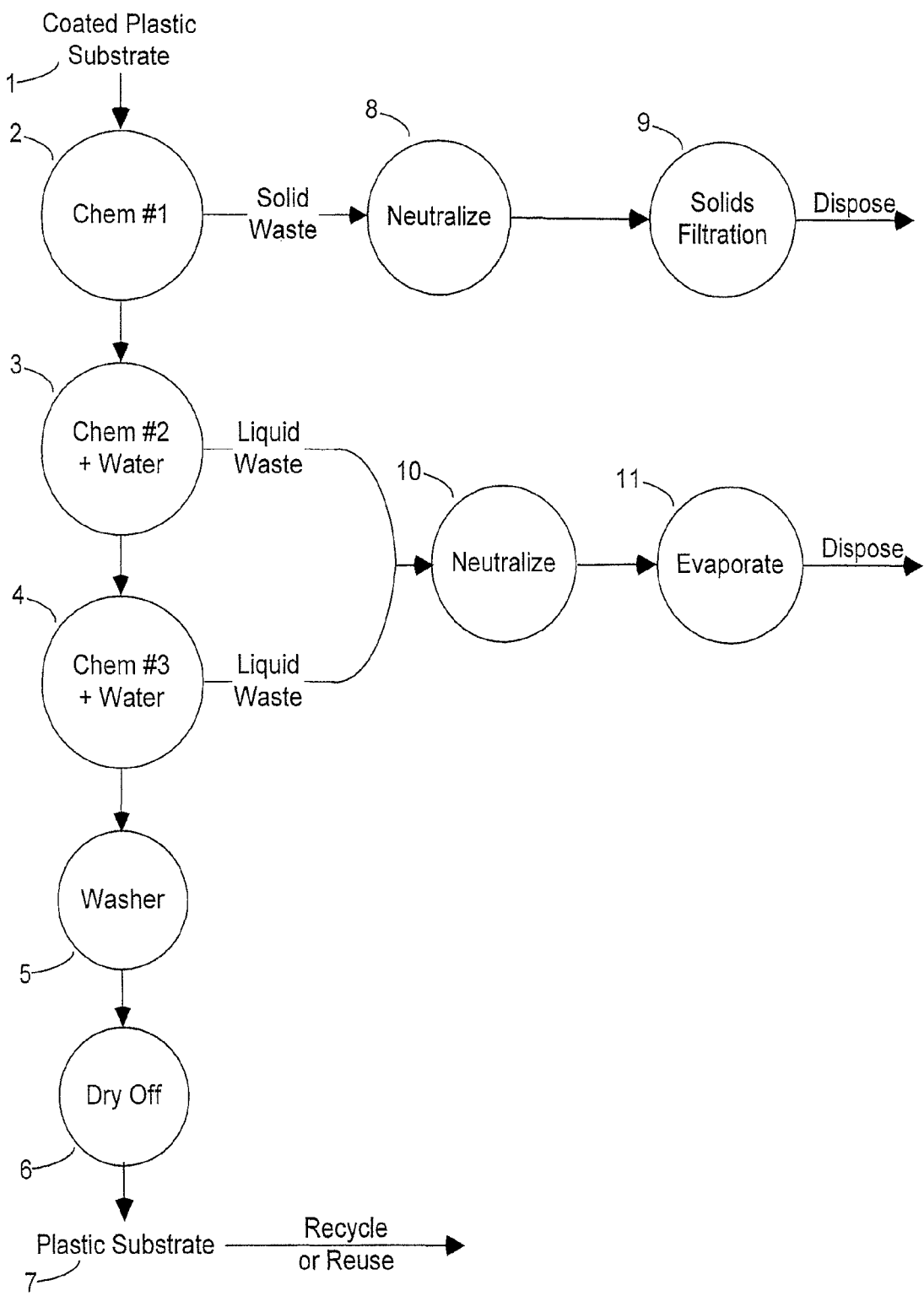

PROCESS FOR REMOVAL OF PAINT FROM PLASTIC SUBSTRATES

CROSS-REFERENCE TO RELATED APPLICATION

This application is a continuation of U.S. patent application Ser. No. 12/693,230, now U.S. Pat. No. 7,744,701, filed on Jan. 25, 2010, entitled PROCESS FOR REMOVAL OF PAINT FROM PLASTIC SUBSTRATES, the entire disclosure of which is hereby incorporated by reference. U.S. patent application Ser. No. 12/693,230, now U.S. Pat. No. 7,744,701, filed on Jan. 25, 2010, entitled PROCESS FOR REMOVAL OF PAINT FROM PLASTIC SUBSTRATES is a continuation of U.S. patent application Ser. No. 12/197,911, filed on Aug. 25, 2008, now abandoned, entitled PROCESS FOR REMOVAL OF PAINT FROM PLASTIC SUBSTRATES, the entire disclosure of which is hereby incorporated by reference. U.S. patent application Ser. No. 12/197,911, filed on Aug. 25, 2008, entitled PROCESS FOR REMOVAL OF PAINT FROM PLASTIC SUBSTRATES, is a continuation of U.S. patent application Ser. No. 11/894,152, now U.S. Pat. No. 7,416,612, filed on Aug. 20, 2007, and issued on Aug. 26, 2008, entitled PROCESS FOR REMOVAL OF PAINT FROM PLASTIC SUBSTRATES, the entire disclosure of which is hereby incorporated by reference. U.S. patent application Ser. No. 11/894,152 is a continuation of U.S. patent application Ser. No. 11/436,304, filed on May 18, 2006, and now issued as U.S. Pat. No. 7,258,750, which issued on Aug. 21, 2007, entitled PROCESS FOR REMOVAL OF PAINT FROM PLASTIC SUBSTRATES, the entire disclosure of which is hereby incorporated by reference. U.S. patent application Ser. No. 11/436,304, is a continuation of U.S. patent application Ser. No. 11/135,128 filed on May 23, 2005, now U.S. Pat. No. 7,052,556, which issued on May 30, 2006, entitled PROCESS FOR REMOVAL OF PAINT FROM PLASTIC SUBSTRATES, the entire disclosure of which is hereby incorporated by reference. U.S. patent application Ser. No. 11/135,128 is a continuation of U.S. patent application Ser. No. 10/797,293, filed on Mar. 10, 2004, entitled PROCESS FOR REMOVAL OF PAINT FROM PLASTIC SUBSTRATES, now abandoned, the entire disclosure of which is hereby incorporated by reference in its entirety. U.S. patent application Ser. No. 10/797,293, filed on Mar. 10, 2004, claims the benefit under 35 U.S.C. §119(e) of U.S. Provisional Application Ser. No. 60/453,375, entitled PROCESS FOR REMOVAL OF PAINT FROM SUBSTRATES, filed Mar. 10, 2003, now abandoned, the entire disclosure of which is incorporated by reference.

BACKGROUND OF THE INVENTION

The present invention generally relates to a process for removing paint from a plastic substrate and substrates treated by the process.

Traditionally, paint is removed from a substrate by either mechanical methods such as abrasives or, in more recent years, using various chemicals. Unfortunately, the mechanical methods developed to remove paint from a substrate do not allow for all of the paint to be removed and the abrasives and abrasive techniques often used may also damage the substrate. Moreover, removing paint mechanically from a substrate is made more difficult if the substrate has many crevices and grooves. In fact, it may be impossible to mechanically remove all of the paint from the substrate. When this occurs, depending on the shape of the substrate, it may not be possible to recycle the substrate for further use in the same or different field because of the chemical contents of the remaining paint.

A good process for removing paint from a substrate typically provides quick, complete removal of the paint without harming the substrate. Removing paint from a plastic substrate is especially difficult. Most chemicals traditionally used to remove paint from wood or metal substrates do not work well with plastic substrates. In addition to removing the paint from a plastic substrate, the chemicals also melt or otherwise damage the plastic substrate. Difficulties are also seen when using most traditional paint stripping chemicals to treat a substrate and remove the paint. Most chemicals used for this process are not biodegradable, may require careful handling, and may have special disposal requirements. They may also be harmful to the environment.

Accordingly, there is a need for an environmentally friendly, thorough, easily handled, disposable, chemical process that removes substantially all of the paint from a substrate, typically a plastic substrate, in a relatively easy, efficient and cost-effective manner to generate paintless, plastic pieces that can be recycled or reused.

SUMMARY OF THE INVENTION

The present invention improves upon earlier processes of removing paint and similar coatings from a painted substrate by providing a process for removing paint from a painted plastic substrate in an environmentally friendly, thorough manner. Also, the chemical fluid used in the process of the present invention is easily handled because it is a non-hazardous aqueous solution.

The processes of the present invention help reduce the amount of plastics in landfills because the resulting uncoated plastic pieces are recyclable. The waste products generated by the present invention are easily disposed of and have few special handling requirements. An embodiment of the present invention includes the process of removing a coating from a plastic substrate. In this embodiment, the process typically includes the steps of immersing and optionally agitating the painted plastic substrate in a first chemical fluid, removing the substrate from the first chemical fluid, immersing and optionally agitating the substrate in a second chemical fluid, removing the substrate from the second chemical fluid, immersing and optionally agitating the substrate in a third chemical fluid. When utilized, the third chemical fluid typically includes substantially the same chemicals as the second chemical fluid. The substrate typically is removed from the third chemical fluid, rinsed, and dried. In this embodiment, the third chemical fluid may optionally be removed, but is typically included in the process. When utilized, the third chemical fluid typically includes substantially the same chemicals as the second chemical fluid. The uncoated plastic substrates are typically collected for recycling or reuse. The uncoated plastic substrates can either be repainted for reuse or can be mechanically reduced in size and then remelted to form new plastic components. In an alternative embodiment, the painted plastic substrate may be mechanically reduced in size to form smaller at least partially coated plastic substrates prior to immersing the at least partially coated plastic substrate into the first chemical fluid. Liquid and solid wastes produced by the process are neutralized by the addition of sodium hydroxide. After the neutralized liquid waste is evaporated, both the neutralized liquid and solid wastes can be safely disposed.

Yet another embodiment of the present invention includes a process for removing a paint coating from a plastic substrate by providing a plastic substrate at least partially coated with a paint coating and immersing the at least partially coated plastic substrate into a first fluid mix that includes at least one aromatic alcohol containing benzyl alcohol; an alpha-hydroxy acid containing glycolic acid; an anionic surfactant containing sodium lauryl sulphate; 2-mercaptobenzothiazole or salts thereof; and an arene containing xylene.

Yet another embodiment of the present invention includes a process for recycling a plastic substrate which is initially at least partially coated with a paint coating by providing a plastic substrate at least partially coated with a paint coating, wherein the plastic substrate is a plastic substrate selected from the group consisting of nylon, polypropylene, polyphenylene oxide (PPO), polyethylene, polycarbonate, thermoplastic polyolefins, polyamide (PA), polyphenylene ether (PPE), thermoplastic urethanes, blended nylon, polyvinyl chloride, polystyrenes, and mixtures thereof; reducing the size of the at least partially coated plastic substrate to form a plurality of plastic substrates; immersing the plurality of plastic substrates into a first fluid mix that includes from about 50% to about 55% of at least one aromatic alcohol, from about 30% to about 40% water, from about 5% to about 10% of an alpha-hydroxy acid, from about 0.5% to about 1.5% of an anionic surfactant, from about 0.5% to about 1% 2-mercaptobenzothiazole or salts thereof, and from about 0.1% to about 1% of an arene, wherein all amounts are by weight of the first fluid mix; rinsing the plurality of plastic substrates with water; drying the plurality of plastic substrates and collecting the plurality of plastic substrates and the immersing and rinsing steps remove the paint coating from the plurality of plastic substrates.

Yet another embodiment of the present invention includes a process for removing a paint coating from a plastic substrate and neutralizing solid waste produced by the process by providing a plastic substrate at least partially coated with a paint coating; immersing the at least partially coated plastic substrate into a first fluid mix that includes at least one aromatic alcohol, an anionic surfactant, 2-mercaptobenzothiazole or salts thereof, an arene, an alpha-hydroxy acid, and water; and neutralizing a solid waste produced by the step of immersing the at least partially coated plastic substrate into the first fluid mix.

These and other features, advantages and objects of the present invention will be further understood and appreciated by those skilled in the art by reference to the following specification, claims and appended drawing.

BRIEF DESCRIPTION OF THE DRAWING

The drawing discloses a process flowchart, according to an embodiment of the present invention.

DETAILED DESCRIPTION OF PREFERRED EMBODIMENT

The present invention includes processes for removing a coating, most typically paint from an at least partially coated plastic substrate by immersing the at least partially coated plastic substrate 1 in a first chemical fluid 2, removing the substrate from the first chemical fluid, immersing the substrate in a second chemical fluid 3, removing the substrate from the second chemical fluid, optionally immersing the substrate in a third chemical fluid 4, which typically contains substantially the same chemicals as the second chemical fluid, rinsing the substrate with water 5, and drying the substrate 6.

The first chemical fluid is typically kept at a temperature of from about 140° F. to about 180° F. at about 100% concentration. The painted substrate is typically submersed in the first chemical fluid for about five minutes to about 120 minutes or until the desired result is achieved. The coated substrate being treated may also optionally be agitated while immersed in the first chemical fluid to further speed the coating removal process.

The first chemical fluid typically contains an aromatic alcohol, a surfactant, an accelerator, water, a paint thinner/solvent, and a coupling agent. Typically, the aromatic alcohol is benzyl alcohol. The surfactant is typically an anionic surfactant, more typically sodium lauryl sulfate. The accelerator is 2-mercaptobenzothiazole. The paint thinner/solvent typically includes at least one arene, more typically the individual xylenes, o-xylene, p-xylene, and m-xylene, and mixture of xylenes. The coupling agent typically includes an α-hydroxy acid, more typically glycolic acid. These components are typically in the following concentrations expressed by weight percentage:

TABLE 1

| Component | Concentration (%) |
| --- | --- |
| Benzyl alcohol | 50-55 |
| Water | 30-40 |
| Glycolic acid | 5-10 |
| Sodium lauryl sulfate | 0.5-1.5 |
| 2-mercaptobenzothiazole | 0.5-1.0 |
| Xylene(s) | 0.1-1.0 |

Benzyl alcohol is typically derived by hydrolysis of benzyl chloride or from benzaldehyde by catalytic reduction or Cannizzaro reaction. It is somewhat soluble in water. One embodiment of the present invention includes about 52% benzyl alcohol.

The surfactant is typically sodium lauryl sulfate $NaC_{12}H_{25}SO_4$. One embodiment of the present invention includes about 1% sodium lauryl sulfate.

Typically, 2-mercaptobenzothiazole (MBT) and salts thereof may be utilized as the accelerator in the process of the present invention. 2-mercaptobenzothiazole is soluble in alcohol, acetone, benzene, and chloroform. Its typical melting point ranges from 164-175° C. One embodiment of the present invention includes about 1% 2-mercaptobenzothiazole.

Xylenes (dimethylbenzene) are typically utilized and include m-xylene, o-xylene, p-xylene, or mixtures thereof. Xylenes are typically produced by fractional distillation from petroleum, coal tar, or coal gas, by catalytic reforming from petroleum, followed by separation of p-xylene by continuous crystallization, and from toluene by transalkylation. Xylenes are typically commercially sold as a mixture of all three isomers, o-, m-, and p-xylene. One embodiment of the present invention includes about 0.5% xylenes.

The typical coupling agent used is the α-hydroxyacid, glycolic acid. Generally, an appropriate coupling agent is one that is soluble in both organic and aqueous media. It is presently believed that in addition to glycolic acid, other α-hydroxyacids may also be used as a coupling agent. One embodiment of the present invention includes about 8% glycolic acid.

The first chemical fluid is typically maintained at a temperature of from about 140° F. to about 180° F. The coated, typically painted plastic substrate is submersed in the first chemical fluid for about five minutes to about 120 minutes or until the desired result is achieved. The time required to reach the desired result depends on the type of substrate, the temperature of the fluid, and the coating being removed. Generally, the lower the temperature of the first chemical fluid, the longer it takes to remove the paint from the painted plastic substrate. The temperature of the first chemical fluid is typically from about 140° F. to about 180° F., more typically from about 150° F. to about 170° F., and even more typically from about 155° F. to about 165° F. The first chemical fluid is most typically maintained at about 160° F.

Next, the substrate is removed from the first chemical fluid. The substrate is then immersed into the second chemical fluid. The second chemical fluid is not required, but further enhances the removal process by further removing paint or coating residue and by rinsing the substrate. Optionally, but not typically, the plastic substrate may be removed from the first chemical fluid and simply rinsed. The second chemical fluid temperature typically ranges from about 68° F. to about 120° F., more typically from about 68° F. to about 110° F., and even more typically from about 90° F. to about 100° F. The second chemical fluid is most typically maintained at about 100° F. The concentration, diluted with water, of the second chemical fluid may range from about 0 to about 100%, but is typically at about 25% to about 30%. Mild agitation may also be applied to the substrate at this stage.

The second chemical fluid typically contains a blend of biodegradable, non-regulated solvents and emulsifiers. The second chemical fluid typically includes an ethylene glycol, monoethyl or diethyl ether, and a dibasic ester. Dibasic esters (DBE) are refined dimethyl esters of adipic, glutaric, and succinic acids. DBEs are clear, colorless liquids that are readily soluble in alcohols, ketones, ethers, and other hydrocarbons, but are only slightly soluble in water. Most typically, the second chemical fluid includes dipropylene glycol dimethyl ether and a mixture of DBE-4, DBE-5, DBE-6 dibasic ester. The second chemical fluid typically has a viscosity of 5-10 cps at 100% concentration, Brookfield Spindle #3, 60 rpm 78° F. The preferred second chemical fluid includes the following concentration of components expressed by weight percentage:

TABLE 2

| Component | Concentration (%) |
| --- | --- |
| DBE-4 dibasic ester (dimethyl succinate) | 55-65 |
| DBE-6 dibasic ester (dimethyl adipate) | 15-25 |
| dipropylene glycol dimethyl ether | 15-25 |
| DBE-5 dibasic ester (dimethyl glutarate) | 1-2 |

Once treated in the second chemical fluid, the substrate is removed from the second chemical fluid. Prior to rinsing, the substrate may optionally be immersed into a third chemical fluid which typically contains substantially the same chemicals as the second chemical fluid described above. When utilized, the third chemical fluid temperature typically ranges from ambient to about 120° F., more typically from about 68° F. to about 110° F., and even more typically from about 90° F. to about 100° F. The third chemical fluid is most typically maintained at about 100° F. The concentration of the chemicals is typically from 0 to about 100% (diluted with water), but, more typically, from about 50% to about 100%. The substrate may be agitated at this stage as well.

After treatment by one or more of these chemical fluids, the plastic substrate is rinsed with water typically from about 100° F. to about 140° F. until the desired result is achieved. Following rinsing, the substrate is dried. The substrate may be air dried or the drying may be accelerated by using heating and/or forced air.

The coated, typically painted plastics suitable for use in accordance with the present invention include automotive components, such as mirrors, door handles, grills, body side moldings, bumper end caps, facias, wheel covers, air bags, instrument panel components, and consoles. The process of the present invention may be utilized to remove paint from various types of plastic substrates, including nylon, thermal plastic polyolefins, polypropylene, polyphenylene-oxide (PPO), polyethylene, polyamide (PA) and polyphenylene ether, thermoplastic urethanes, polyphenylene ether, polyvinyl chloride, polycarbonate, blended nylon, polypropylene, polyphenylene oxide and polyamide, and high impact polystyrenes.

The types of paint coatings that may be removed using the process of the present invention include one and two component urethane paints, soft touch paints, enamel based paints, water based paints, soft feel, epoxy, water borne, polyester, soft suede, lacquer, and rigid/flex clears.

Any solid waste produced by following the processes of the present invention has, to date, been shown to be able to be neutralized with a base 8, typically, sodium hydroxide filtered 9, and safely disposed of after proper testing and approval of a sample performed by a licensed waste company. In testing the present invention, a solid waste sample was tested by a licensed waste company and found to be a non-hazardous material as shown in Table 3.

TABLE 3

| Element or Compound | Analysis Results | Units |
| --- | --- | --- |
| Benzyl alcohol | 2.7 | % |
| Antimony | <34 | mg/kg |
| Arsenic | <23 | mg/kg |
| Barium | <92 | mg/kg |
| Beryllium | <1.1 | mg/kg |
| Cadmium | <6.9 | mg/kg |
| Chromium | <4.6 | mg/kg |
| Cobalt | <6.9 | mg/kg |
| Copper | <41 | mg/kg |
| Iron | 1200 | mg/Kg |
| Lead | 72 | mg/Kg |
| Magnesium | 750 | mg/Kg |
| Manganese | <4.6 | mg/Kg |
| Mercury | <23 | mg/Kg |
| Nickel | 300 | mg/Kg |
| Phosphorus | 63 | mg/Kg |
| Selenium | 46 | mg/Kg |
| Silver | <2.3 | mg/Kg |
| Thallium | <69 | mg/Kg |
| Titanium | 440 | mg/Kg |
| Vanadium | <4.6 | mg/Kg |
| Zinc | 230 | mg/Kg |

This is also true for the liquid waste from the rinse water. Like the solid waste, the liquid waste produced by following the process of the present invention has, to date, been shown to be able to be neutralized with a base 10, typically, sodium hydroxide. The neutralized liquid is then evaporated 11 and safely disposed of after proper testing and approval of a sample performed by a licensed waste company. In testing the present invention, a liquid waste sample was tested by a licensed waste company and found to be a non-hazardous material. In particular, the liquid waste was found to have an undetectable concentration of the following compounds: acetone, bromobenzene, benzene, bromodichloromethane, bromoform, bromomethane, 2-butanone, carbon tetrachloride, chlorobenzene, chlorodibromomethane, chloroethane, chloroform, chloromethane, 2-chlorotoluene, 4-chlorotoluene, cis-1,2 dichloroethene, trans-1,2-dichloroethene, dibromomethane, 1,2-dibromo-3-chloropropane, 1,2-dichlorobenzene, 1,3-dichlorobenzene, 1,4-dichlorobenzene, 1,1-dichloroethane, 1,2-dichloroethane, 1,1-dichloroethene, 1,2-dichloropropane, 1,3-dichloropropane, 2,2-dichloropropane, 1,1-dichloropropene, cis-1,3-dichloropropene, trans-1,3-dichloropropene, ethylbenzene, ethylenedibromide, fluorotrichloromethane, 2-hexanone, hexachlorobutadiene, isopropylbenzene, 4-methyl-2-pentanone, methylene chloride, methyl-t-butylether, n-butylbenzene, n-propylbenzene, naphthalene, m-xylene, p-xylene, p-isopropyltoluene, o-xylene, sec-butylbenzene, styrene, tert-butylbenzene, tetrachloroethene, 1,1,1,2-tetrachloroethane, 1,1,2,2-tetrachloroethane, toluene, 1,2,3-trichlorobenzene, 1,2,4-trichlorobenzene, 1,1,1-trichloroethane, 1,1,2-trichloroethane, trichloroethane, 1,2,3-trichloropropane, 1,2,4-trimethylbenzene, 1,3,5-trimethylbenzene, and vinyl chloride.

An enormous amount of scrap is generated in the plastic automotive component industry. In fact, it is believed that up to 1.5 million tons of scrap plastic are sent by the automotive industry to landfills each year. The processes of the present invention significantly reduce the amount of plastics in landfills because the uncoated plastic pieces 7 can be either recycled or reused, allowing recovery of used or defective plastic components. Recycling or reusing uncoated plastic pieces is accomplished by first collecting the uncoated plastic substrates. The uncoated plastic substrates then can be repainted for reuse. Alternatively, the uncoated plastic substrates are typically mechanically or otherwise reduced in size and then melted to form new plastic components.

The whole, at least partially painted plastic substrates can be mechanically or otherwise reduced in size to form smaller, at least partially coated plastic substrates prior to immersing it into the first chemical fluid. Mechanically or otherwise reducing the size of large at least partially coated plastic substrates allows simultaneous treatment of large volumes of substrates that when processed will be immediately ready for recycling.

The process of the present invention is capable of removing the paint from a painted plastic substrate, regardless of the size of the substrate. For large plastic substrates, such as automotive grills and body side moldings, the various chemical fluids can be contained in a fluid retaining device, such as a vat or tank. This also applies to large volumes of small plastic substrates whether mechanically processed from larger pieces or not.

The first, second, and third chemical fluids can be concentrated and packaged as a kit for removing paint from a painted plastic substrate. Using the enclosed instructions, an end user can add a desired amount of water to rehydrate the chemical fluids prior to starting the process of the present invention.

The above description is considered that of the preferred embodiments only. Modifications of the invention will occur to those skilled in the art and to those who make or use the invention. Therefore, it is understood that the embodiments shown in the drawing and described above are merely for illustrative purposes and not intended to limit the scope of the invention, which is defined by the following claims as interpreted according to the principles of patent law, including the doctrine of equivalents.

The invention claimed is:

1. A process for removing a paint coating from a plastic automobile component comprising the steps of:
   providing a plastic automobile component at least partially coated with paint;
   immersing the plastic automobile component into a first non-hazardous aqueous solution comprising: at least one aromatic alcohol; an alpha-hydroxy acid; an anionic surfactant; 2-mercaptobenzothiazole or salts thereof; a xylene; and water for from about five minutes to about 120 minutes and wherein the xylene comprises from about 0.1% to about 1.0% by weight of the solution; and
   removing the paint from the plastic automobile component using the immersing step; and
   wherein plastic automobile component is rinsed in water and the water collected after the rinsing is liquid waste and wherein the liquid waste is neutralized with a base such that, after treatment with the base, the liquid waste has undetectable concentrations of acetone, bromobenzene, benzene, bromodichloromethane, bromoform, bromomethane, 2-butanone, carbon tetrachloride, chlorobenzene, chlorodibromomethane, chloroethane, chloroform, chloromethane, 2-chlorotoluene, 4-chlorotoluene, cis-1,2 dichloroethene, trans-1,2-dichloroethene, dibromomethane, 1,2-dibromo-3-chloropropane, 1,2-dichlorobenzene, 1,3-dichlorobenzene, 1,4-dichlorobenzene, 1,1-dichloroethane, 1,2-dichloroethane, 1,1-dichloroethene, 1,2-dichloropropane, 1,3-dichloropropane, 2,2-dichloropropane, 1,1-dichloropropene, cis-1,3-dichloropropene, trans-1,3-dichloropropene, ethylbenzene, ethylenedibromide, fluorotrichloromethane, 2-hexanone, hexachlorobutadiene, isopropylbenzene, 4-methyl-2-pentanone, methylene chloride, methyl-t-butylether, n-butylbenzene, n-propylbenzene, naphthalene, m-xylene, p-xylene, p-isopropyltoluene, o-xylene, sec-butylbenzene, styrene, tert-butylbenzene, tetrachloroethene, 1,1,1,2-tetrachloroethane, 1,1,2,2-tetrachloroethane, toluene, 1,2,3-trichlorobenzene, 1,2,4-trichlorobenzene, 1,1,1-trichloroethane, 1,1,2-trichloroethane, trichloroethane, 1,2,3-trichloropropane, 1,2,4-trimethylbenzene, 1,3,5-trimethylbenzene, and vinyl chloride.

2. The process of claim 1, wherein the first non-hazardous aqueous solution is at temperatures of from about 140° F. to about 180° F.

3. The process of claim 1, wherein the process of removing the paint from the plastic automobile component generates solid waste and the process further comprises the step of neutralizing the solid waste.

4. The process of claim 1, wherein the plastic automobile component comprises a plastic substrate selected from the group consisting of nylon, polypropylene, polyphenylene oxide (PPO), polyethylene, polycarbonate, thermoplastic polyolefins, polyamide (PA), polyphenylene ether (PPE), thermoplastic urethanes, blended nylon, polyvinyl chloride, polystyrenes, and mixtures thereof.

5. The process of claim 1, wherein the plastic automobile component is rinsed with water after being immersed in the first non-hazardous aqueous solution and the immersion and rinsing steps remove the paint from the plastic automobile component.

6. The process of claim 1 further comprising the step of immersing the at least partially coated plastic automobile component into a first fluid mix comprising dipropylene glycol dimethyl ether, dimethyl succinate, dimethyl glutarate, and dimethyl adipate and wherein the first fluid mix comprises:
   from about 15% to about 25% dipropylene glycol dimethyl ether by weight of the first fluid mix;
   from about 55% to about 65% dimethyl succinate by weight of the first fluid mix;
   from about 1% to about 2% dimethyl glutarate by weight of the first fluid mix; and from about 15% to about 25% dimethyl adipate by weight of the first fluid mix; and wherein the process further comprises the step of immersing the at least partially coated plastic automobile component into a second fluid mix after immersing the at least partially coated plastic automobile component in the first fluid mix, and wherein the second fluid mix comprises:

from about 15% to about 25% dipropylene glycol dimethyl ether by weight of the second fluid mix;

from about 55% to about 65% dimethyl succinate by weight of the second fluid mix;

from about 1% to about 2% dimethyl glutarate by weight of the second fluid mix; and from about 15% to about 25% dimethyl adipate by weight of the second fluid mix; and wherein the first fluid mix is diluted with water and the second fluid mix is diluted with water; and wherein the first fluid mix has a viscosity of 5-10 cps at 100% prior to dilution in water, Brookfield Spindle #3, 60 rpm 78° F.

7. The process of claim 2, wherein the process of removing the paint from the plastic automobile component generates solid waste and the liquid waste and the process further comprises the step of neutralizing the solid waste.

8. The process of claim 2, wherein the first non-hazardous aqueous solution is at a temperature of from about 155° F. to about 165° F.

9. The process of claim 2 further comprising the step of agitating the plastic automobile component while the plastic automobile component is immersed in the first non-hazardous aqueous solution.

10. The process of claim 7, wherein the first, non-hazardous aqueous solution is at a temperature of from about 155° F. to about 165° F.

11. The process of claim 7 further comprising the step of agitating the plastic automobile component while the plastic automobile component is immersed in the first non-hazardous aqueous solution and wherein the first non-hazardous aqueous solution is at a temperature of from about 150° F. to about 170° F.

12. The process of claim 10 further comprising the step of safely disposing of the liquid and solid waste.

13. The process of claim 10, wherein the paint on the plastic automobile component having paint thereon comprises a paint chosen from the group consisting of urethane paints, soft touch paints, enamel based paints, and water-based paints.

14. The process of claim 12 further comprising the step of reducing the size of the plastic automobile component to form a plurality of plastic substrates.

15. The process of claim 13, wherein the first non-hazardous aqueous solution consists essentially of the at least one aromatic alcohol; the alpha-hydroxy acid; the anionic surfactant; the 2-mercaptobenzothiazole or salts thereof; the xylene; and the water.

16. The process of claim 13, wherein the at least one aromatic alcohol comprises benzyl alcohol and the at least one aromatic alcohol comprises from about 50% to about 55% by weight of the first non-hazardous aqueous solution; wherein the anionic surfactant comprises sodium lauryl sulphate and the anionic surfactant comprises from about 0.5% to 1.5% by weight of the first non-hazardous aqueous solution; wherein 2-mercaptobenzothiazole or salts thereof comprises from about 0.5% to about 1% by weight of the first non-hazardous aqueous solution; and wherein the alpha-hydroxy acid comprises glycolic acid and the alpha-hydroxy acid comprises from about 5% to about 10% by weight of the first non-hazardous aqueous solution.

17. The process of claim 14, wherein the step of reducing the size of the plastic automobile component to form a plurality of plastic substrates is before the step of immersing the at least partially coated automobile component into the first non-hazardous aqueous solution.

18. A process for removing a paint coating from a plastic automobile component comprising the steps of:

providing a plastic automobile component at least partially coated with paint;

immersing the plastic automobile component into a first non-hazardous aqueous solution comprising: at least one aromatic alcohol; an alpha-hydroxy acid; an anionic surfactant; 2-mercaptobenzothiazole or salts thereof; a xylene; and water for from about five minutes to about 120 minutes;

removing the paint from the plastic automobile component using the immersing step wherein the step of removing paint from the plastic automobile component produces a liquid waste material;

neutralizing the liquid waste material with a base to form a neutralized, liquid waste material;

safely disposing of the neutralized, liquid waste material; and wherein the neutralized, liquid waste material has undetectable concentrations of acetone, bromobenzene, benzene, bromodichloromethane, bromoform, bromomethane, 2-butanone, carbon tetrachloride, chlorobenzene, chlorodibromomethane, chloroethane, chloroform, chloromethane, 2-chlorotoluene, 4-chlorotoluene, cis-1,2 dichloroethene, trans-1,2-dichloroethene, dibromomethane, 1,2-dibromo-3-chloropropane, 1,2-dichlorobenzene, 1,3-dichlorobenzene, 1,4-dichlorobenzene, 1,1-dichloroethane, 1,2-dichloroethane, 1,1-dichloroethene, 1,2-dichloropropane, 1,3-dichloropropane, 2,2-dichloropropane, 1,1-dichloropropene, cis-1,3-dichloropropene, trans-1,3-dichloropropene, ethylbenzene, ethylenedibromide, fluorotrichloromethane, 2-hexanone, hexachlorobutadiene, isopropylbenzene, 4-methyl-2-pentanone, methylene chloride, methyl-t-butylether, n-butylbenzene, n-propylbenzene, naphthalene, m-xylene, p-xylene, p-isopropyltoluene, o-xylene, sec-butylbenzene, styrene, tert-butylbenzene, tetrachloroethene, 1,1,1,2-tetrachloroethane, 1,1,2,2-tetrachloroethane, toluene, 1,2,3-trichlorobenzene, 1,2,4-trichlorobenzene, 1,1,1-trichloroethane, 1,1,2-trichloroethane, trichloroethane, 1,2,3-trichloropropane, 1,2,4-trimethylbenzene, 1,3,5-trimethylbenzene, and vinyl chloride.

19. A process for removing a paint coating from a plastic automobile component comprising the steps of:

providing a plastic automobile component at least partially coated with paint;

immersing the plastic automobile component into a first non-hazardous aqueous solution consisting of: at least one aromatic alcohol; an alpha-hydroxy acid; an anionic surfactant; 2-mercaptobenzothiazole or salts thereof; a xylene; and water; and removing the paint from the plastic automobile component using the immersing step.

20. The process of claim 19 further comprising the steps of:

rinsing the plastic automobile component with water after the plastic automobile component is removed from the first non-hazardous aqueous solution and wherein the rinsing and immersing steps produce liquid and solid waste material;

neutralizing the liquid waste material with a base to form a neutralized, non-hazardous liquid waste material;

wherein the neutralized, non-hazardous liquid waste material has undetectable concentrations of the following components: acetone, bromobenzene, benzene, bromodichloromethane, bromoform, bromomethane, 2-butanone, carbon tetrachloride, chlorobenzene, chlorodibromomethane, chloroethane, chloroform, chloromethane, 2-chlorotoluene, 4-chlorotoluene, cis-1,2 dichloroethene, trans-1,2-dichloroethene, dibromomethane, 1,2-dibromo-3-chloropropane, 1,2-dichlorobenzene, 1,3-dichlorobenzene, 1,4-dichlorobenzene, 1,1-dichloroethane, 1,2-dichloroethane, 1,1-dichloroethene, 1,2-dichloropropane, 1,3-dichloropropane, 2,2-dichloropropane, 1,1-dichloropropene, cis-1,3-dichloropropene, trans-1,3-dichloropropene, ethylbenzene, ethylenedibromide, fluorotrichloromethane, 2-hexanone, hexachlorobutadiene, isopropylbenzene, 4-methyl-2-pentanone, methylene chloride, methyl-t-butylether, n-butylbenzene, n-propylbenzene, naphthalene, m-xylene, p-xylene, p-isopropyltoluene, o-xylene, sec-butylbenzene, styrene, tert-butylbenzene, tetrachloroethene, 1,1,1,2-tetrachloroethane, 1,1,2,2-tetrachloroethane, toluene, 1,2,3-trichlorobenzene, 1,2,4-trichlorobenzene, 1,1,1-trichloroethane, 1,1,2-trichloroethane, trichloroethane, 1,2,3-trichloropropane, 1,2,4-trimethylbenzene, 1,3,5-trimethylbenzene, and vinyl chloride; and wherein the neutralized, non-hazardous liquid waste material is thereafter evaporated and safely disposed of.

* * * * *